United States Patent [19]
Bellos et al.

[11] Patent Number: 5,637,223
[45] Date of Patent: *Jun. 10, 1997

[54] METHOD OF REMOVING WATER SOLUBLE ORGANICS FROM OIL PROCESS WATER

[75] Inventors: Thomas J. Bellos, St. Louis; Gregory P. Noelken, St. Peters, both of Mo.

[73] Assignee: Petrolite Corporation, St. Louis, Mo.

[*] Notice: The term of this patent shall not extend beyond the expiration date of Pat. No. 5,364,532.

[21] Appl. No.: 614,760

[22] Filed: Mar. 13, 1996

Related U.S. Application Data

[63] Continuation of Ser. No. 259,424, Jun. 14, 1994, abandoned, which is a continuation-in-part of Ser. No. 25,348, Mar. 2, 1993, Pat. No. 5,364,532, which is a continuation-in-part of Ser. No. 939,771, Sep. 3, 1992, abandoned.

[51] Int. Cl.$^6$ .................. C02F 1/26; B01D 17/05
[52] U.S. Cl. .................. 210/639; 166/267; 210/698; 210/708; 210/908; 252/329; 252/358
[58] Field of Search .................. 166/267; 210/639, 210/698, 705, 708, 724, 725, 908; 252/328, 329, 333, 347, 348, 358

[56] References Cited

U.S. PATENT DOCUMENTS

| Re. 29,908 | 2/1979 | Fowler et al. | 210/708 |
|---|---|---|---|
| 2,504,019 | 4/1950 | Hall | 252/330 |
| 3,108,059 | 10/1963 | Greenwald | 210/708 X |
| 3,687,845 | 8/1972 | Treat | 252/348 X |
| 3,707,464 | 12/1972 | Burns et al. | 210/724 X |
| 4,035,289 | 7/1977 | Guillerme et al. | 210/724 X |
| 4,058,453 | 11/1977 | Patel et al. | 252/329 X |
| 4,198,294 | 4/1980 | Deane | 210/704 X |
| 4,283,290 | 8/1981 | Davies | 210/643 |
| 4,311,596 | 1/1982 | Gleim | 210/725 X |
| 4,317,487 | 3/1982 | Merkl | 252/358 |
| 4,401,570 | 8/1983 | Blytas et al. | 210/639 |
| 4,818,410 | 4/1989 | Bellos et al. | 210/639 |
| 4,839,054 | 6/1989 | Ruebush et al. | 210/639 |
| 4,986,917 | 1/1991 | Adams et al. | 210/634 |
| 5,128,046 | 7/1992 | Marble et al. | 210/705 |
| 5,364,532 | 11/1994 | Bellos et al. | 210/698 |

FOREIGN PATENT DOCUMENTS

| 53-118854 | 1/1978 | Japan. |
|---|---|---|

OTHER PUBLICATIONS

"Treatment of Refinery Emulsions and Chemical Wastes", Phillips, Cecil Jr., Industrial and Engineering Chemistry, vol. 46, No. 2, pp. 300–303, Feb., 1954.

"Naphthenic Acids in Stratal Waters", Gerasyuto, Z.S., T.R. Vses, Neft, Nauch.–Issled. Geologorazved. Inst., 342, 157–61 (1973).

Perry's Chemical Engineers' Handbook, Perry et al., 4th Edition, 14–40, 14–42 (1963).

Federal Register, vol. 1, No. 131, Jul. 9, 1986.

Primary Examiner—Peter A. Hruskoci
Attorney, Agent, or Firm—Kenneth Solomon

[57] ABSTRACT

Oil well production fluid composed of oil and water and containing in excess of 100 ppm water soluble petroleum carboxylates in anionic form dissolved in the water is treated by acidifying the fluid to a pH of 6.0 or lower with a combination of a strong organic acid and a strong mineral acid and then is intimately mixed. The oil and water are separated one from the other. The content of the water soluble organics in the water is thereby substantially transferred to the oil phase. In a second aspect of the invention, water used to extract corrosive compounds to render the oil suitable for fueling gas turbine power plants is acidified to a pH of 6.0 or lower and is thereafter intimately mixed with fuel oil.

27 Claims, 1 Drawing Sheet

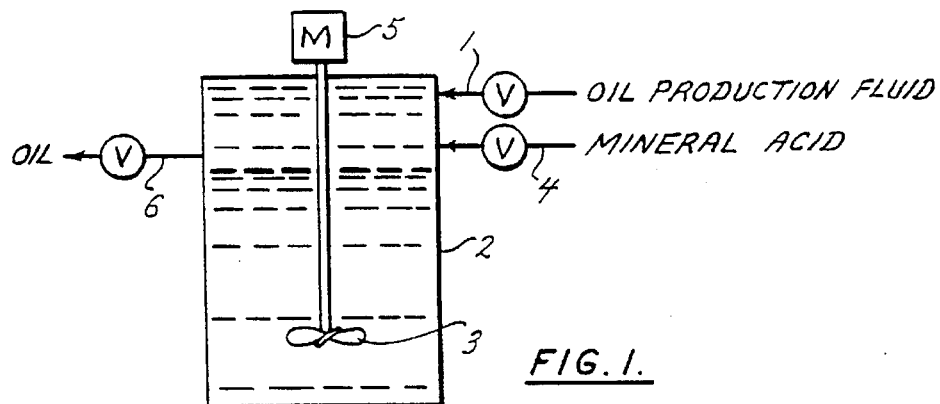
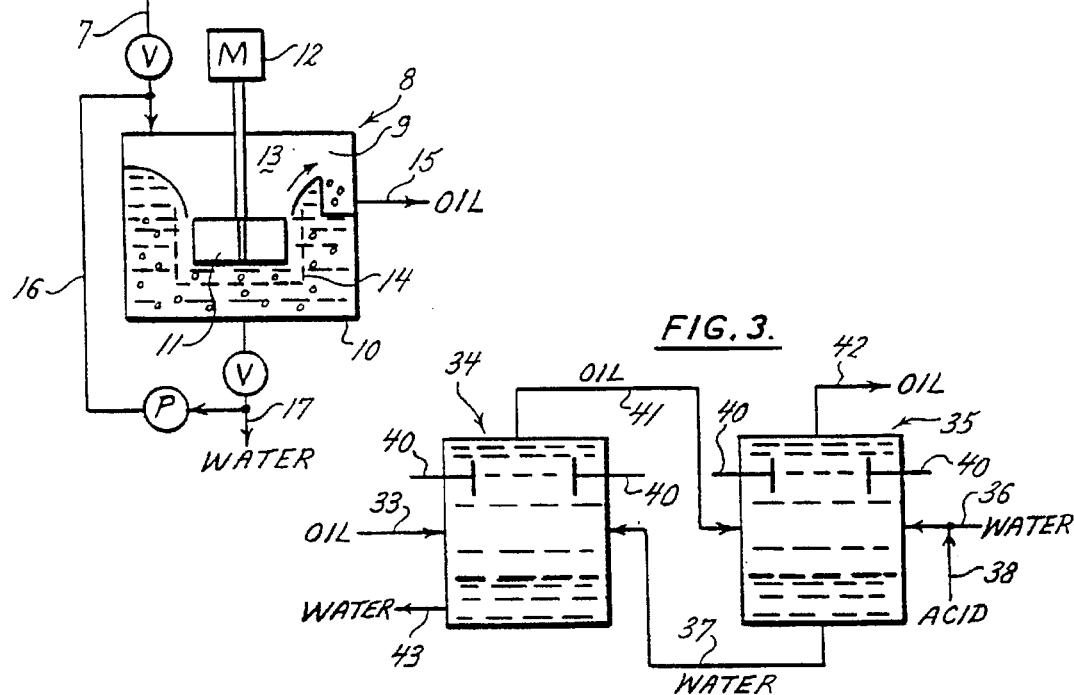
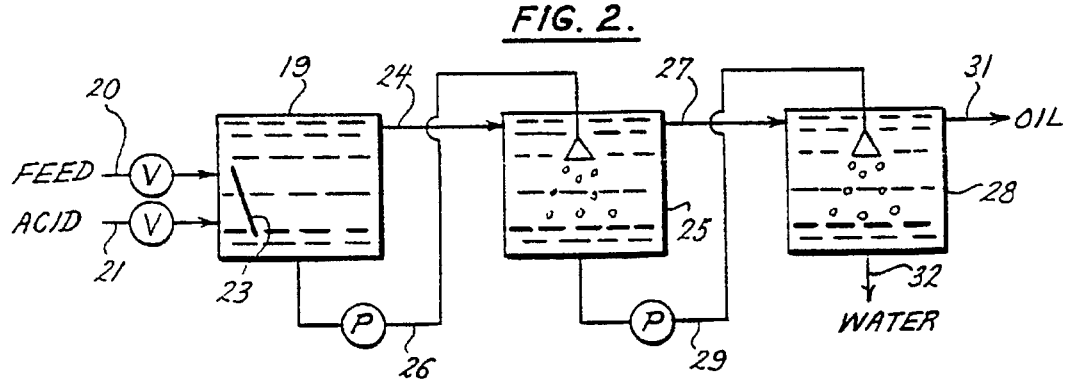

METHOD OF REMOVING WATER SOLUBLE ORGANICS FROM OIL PROCESS WATER

This is a continuation application of U.S. Ser. No. 08/259,424, filed Jun. 14, 1994, now abandoned which is a continuation in part application of U.S. Ser. No. 08/025,348, filed Mar. 2, 1993, (issued as U.S. Pat. No. 5,364,532 on Nov. 15, 1994) which application is a continuation in part application of U.S. Ser. No. 07/939,771, filed Sep. 3, 1992 (now abandoned).

BACKGROUND OF THE INVENTION

1. Field of the Invention

This invention relates to the removal and recovery of water soluble organics (WSO) from oil process water. In particular, the present invention relates to the removal and recovery of certain water soluble petroleum organics from crude oil production water and from aqueous streams used in removing water and/or inorganic salts, such as sodium chloride, from crude oil, residual oil, waste oils and the like.

In the removal of crude oil or production fluid from earth formations significant quantities of water are quite often removed along with the oil. In the Middle East, the production fluid can be virtually pure oil. However, it is not uncommon that oil well production fluids are composed of 90% or more of water and only 10% or less of crude oil. Such water is referred to as connate water and is produced along with the oil. Oil well production fluid typically comprises water, oil, water soluble substances (e.g., naphthenic acids, phenols and inorganic salts) and cations that tend to form scale (e.g., calcium, barium and strontium ions).

One of the first steps after removal of the oil well production fluid is to separate the oil from the water by phase separation techniques. The phrase "oil process water" refers to the water of such oil water production fluid as well as to the water phase produced by such phase separation.

Conventionally, separation is accomplished using a bulk separator or a free water knock out system. Virtually all of the hydrocarbon is conveniently recovered in this manner. Unfortunately, certain organic compounds, as well as inorganic salts and acids, are soluble in water; and mere phase separation will not remove the water soluble compounds from the aqueous phase. Water soluble organics include, among other things, certain naphthenates, phenols, lower fatty acids, etc. Water soluble inorganic salts include sodium chloride, sodium sulfate, calcium chloride, barium chloride, etc. While the amount of water soluble organics may be relatively small, up to 1,000 ppm, they nevertheless give rise to environmental problems, when the aqueous phase is discharged into the environment without the removal of the water soluble organics. Furthermore, the water soluble organics may be valuable substances. In order to meet present day strict environmental standards, a process to reduce the level of the water soluble organics in the discharged streams to 50 ppm or less is needed. The present invention provides a simple, economical procedure for accomplishing this end. While known methods can reduce the content of water soluble organics to the desired low level, they are relatively complex and/or expensive in comparison with the process of the present invention. For example, one could separate the water and water soluble organics by distillation or the use of biological treating ponds.

Use of certain petroleum fuel oils for specific purposes requires that such oils be treated in order to remove undesirable corrosive contaminants therefrom. For example, fuel oils used in the newer, high efficient, gas turbine power plants must meet certain strict requirements with respect to the presence of inorganic contaminants in the oil. The presence of sodium chloride and other similar inorganic salts renders the oil less than suitable as a fuel for use in gas turbine power plants. To upgrade fuel oil so that it is acceptable for use in the turbines, the fuel oil is commonly processed using a multi-stage electrostatic desalting facility. In such operation essentially complete removal of water soluble inorganic salts from fuel oil is accomplished by a counter-current water washing process in which a high electrostatic gradient is used to break the interim water-in-oil emulsion. Selective specialized chemical demulsifiers are normally used in such salt removal processes. While the process removes the inorganic salts from the fuel oil, unfortunately the wash water removes the water soluble organics from the fuel oil. In view of strict environmental standards, it is of considerable importance to remove these water soluble organics present in the wash water of the inorganic salt removal processes used to render the fuel acceptable for burning in turbines.

The invention is directed to a simple, straightforward method of removal of water soluble organics from oil well production fluids, as well as from aqueous streams used to render fuel oil acceptable for use as fuel for gas turbine power plants by the removal of inorganic salts therefrom.

2. Description of the Prior Art

U.S. Reissue Pat. No. 29,908 discloses recovery of oily waste in water by the use of a demulsification-flocculation separation process employing a combination acid-alum treatment. This process has no effect of removing water soluble oils.

U.S. Pat. No. 3,687,845 discloses removal of tramp oils from oil-in-water emulsions by the addition of a water soluble anionic polymer of high molecular weight and heat treatment of the emulsions so that the oils are coalesced and float to the surface of the liquid. Water soluble oils are unaffected by this treatment.

U.S. Pat. No. 3,707,464 discloses the addition of caustic or acid to adjust the pH of the liquid to about 8.0 to accelerate gravitational separation of oils and solids and the use of elevated temperatures to accelerate the separation process. Rather than being removed, water soluble organics in the solution would be stabilized by this treatment.

U.S. Pat. No. 4,035,289 discloses the use of microorganisms to reduce the presence of organic material in mineral oil drilling fluids. This is an example of the slow, expensive know methods involving biological treatments or use of absorbent materials, like charcoal and/or ion exchange resins.

U.S. Pat. Nos. 4,818,410 and 4,839,054 are directed to techniques for removing water soluble organics from oil process water by acidifying the water, contacting the acidified water with oil and thereafter separating the oil from the water. However, these patents recommend use of a mineral acid such as sulfuric acid, hydrochloric acid or phosphoric acid. Use of such acids involves in several drawbacks. Sulfuric acid and hydrochloric acid are corrosive to metal surfaces in the water to be treated. Phosphoric acid forms a precipitate with multivalent cations such as $Ca^{+2}$ in the water, resulting in formation of scale and oil-wetting particles that tend to retain oil in the water phase. The agglomeration of oil onto such particles reduces the quality of phase separation and the particles carry the oil through the system, thereby fouling the system.

SUMMARY OF THE INVENTION

In accordance with the present invention, there is provided a process for the removal of petroleum organic and biogenic process substances dissolved in aqueous streams. Such aqueous streams include oil well production fluids from which oil has been primarily separated and aqueous streams used in extracting inorganic salts, such as sodium chloride, from oils, in order to render such oils satisfactory for subsequent refining or for burning in gas turbine power plants or processing in other equipment where the presence of the inorganic salts is undesirable. The oil process water to which the present invention applies may contain dissolved therein a small amount; e.g., 100–1,000 ppm or more, of petroleum organics. First, the pH of the oil process water is adjusted to within the range of about 2 to 6, preferably in the range of 3–5 by incorporating a strong organic acid and a strong mineral acid therein. The strong organic acid is one that forms a water soluble salt with $Ca^{+2}$. The pH adjustment may be made for an appropriate oil/water mixture or a previously acidified aqueous stream. Second, during or after the pH adjustment, the oil process water is intimately contacted with oil with the result that the content of water soluble organics in the oil process water is substantially reduced by being transferred from the water to the oil. Finally, the oil is separated from the oil process water.

By practicing the present invention, one is able advantageously to recover considerable amounts of valuable material and to avoid or minimize the need to upgrade oil process water prior to discharge in the environment by employing high cost waste treatment procedures.

For example, typically, an operator may treat 900,000 barrels of water per day associated with its crude oil production. The water thus made available for tertiary water treatment contains 1,000 ppm of free oil plus water soluble oil. Distribution between these two oil forms may be 50/50. Therefore, in such operation, 37,800 gallons of water soluble organics are carried along as a very minor attendant component of the enormous volume of water being handled.

About 450 barrels of the free oil per day present as a dilute dispersion of fine oil droplets is removable from this flow by established methods, including use of induced air flotation with or without demulsifiers and flocculants. Thus, 18,900 gallons of valuable oil may be routinely recovered. However, another 450 barrels of water soluble organics per day of about equal value remains dissolved in the water, which may be reinjected downhole. The present invention provides a convenient method to recover the water soluble oil also. Additionally, the present invention can be advantageously used in the on-site processing of certain petroleum products as fuel.

Often, the operator is able to dispose of its contaminated water, containing water soluble organics, by reinjection. In other cases where this option is not available, lack of a practical method to remove the water soluble organic component would invoke another even larger penalty—from environmental regulations. In order to remove the water soluble organic component of the contaminated water to make possible its disposal in streams or in aquifers, slow biological percolation in a series of treatment ponds, with consequent high cost, may be the operator's only option.

BRIEF DESCRIPTION OF THE DRAWINGS

FIG. 1 is a schematic block diagram showing apparatus for practicing the present invention with an oil/water stream, wherein a mineral acid is introduced to provide transfer of water soluble oil into the oil phase. An air flotation system (AFS) is used to remove minute particles of insoluble oil.

FIG. 2 is a schematic block diagram showing another apparatus for practicing the present invention with an oil/water production stream in a continuous manner.

FIG. 3 is a schematic block diagram showing yet another apparatus for practicing the present invention, wherein acidified wash water runs countercurrent to oil flow in an electrostatic fuel oil desalter. In the operation the soluble oil is retained by the desalted fuel oil; and the effluent water has a reduced quantity of water soluble oil.

DETAILED DESCRIPTION OF THE PREFERRED EMBODIMENTS

In accordance with the present invention, it has been discovered that very effective removal of water soluble organics (WSO) from oil process water can be achieved in a process in which a combination of a strong organic acid and a strong mineral acid such as phosphoric acid is incorporated into the water, the acidified water is contacted intimately with oil (such as by agitation, for example, in a static mixer or a mixing chamber, or as a natural result of the mixing obtained when the acidified water and oil flow through the piping and vessels associated with the production of crude oil) and the oil is thereafter separated from the water. According to the present method, a strong organic acid that forms a water soluble salt with calcium ions is incorporated into the water simultaneously with or prior to the incorporation of the mineral acid into the water. As used herein, "water soluble" means that the salt is soluble in the treated (i.e., acidified) water at the concentrations involved.

Surprisingly, it has been found that by including the organic acid, formation of scale such as calcium phosphate or calcium sulfate is inhibited; that is, the scale formation is reduced substantially from that which would occur without use of the organic acid or even is eliminated in the method. Moreover, it has been discovered that by using a combination of organic acid and mineral acid, less total acid may be required to achieve the desired reduction of WSO than when phosphoric acid or other mineral acid is employed in the absence of such organic acids. This greatly reduces the impact on equipment and the environment. Some of the organic acid combinations do not form a soluble product with calcium, magnesium, etc., but function as they retard to eliminate deposits as a scale and use removal through the flotation process.

It is conventional to denote the water soluble organics found in and recovered from petroleum generally as "petroleum acids" and more specifically as "naphthenic acids". Chemically, the petroleum acids are, in the main, monocarboxylic acids related to the naphthalene (alicyclic) series of hydrocarbons. However, other petroleum acidic substances are included. For example, substituted phenols, mercaptans, long chain ketones, etc. may act as petroleum acids in the sense of this process. Petroleum acids are natural components of crude oil and are not formed by refining. A typical formula of the acids may be written as $R(CH_2)_n COOH$, wherein R may be a cyclic moiety composed of 1, 2, 3 or more rings including such acids as cyclopentaneacetic acid and trans-2,2,6-trimethylcyclohexylacetic acid and n is usually 1 or higher. Aromatic rings, saturated rings and fused rings are normally present. It has been found that as many as 120 or more different petroleum acids may be present in a given crude oil. Most are soluble in all proportions in hydrocarbons, but most of the acids of the series have only slight solubility in water. However, as their sodium salts or other alkali metal salts these naphthenates are preferentially water soluble.

It is with removal of these water soluble organics that the present invention is concerned. It is to be understood that, at the pH of the naturally occurring aqueous compositions, the acids may exist as anions in association with counterions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts.

Having described the process of the present invention briefly and in general terms, reference is now made to the drawings which illustrate diagrammatically specific embodiments of the present invention. Referring now to the flow diagram in FIG. 1 of the drawings, it is noted that in operation oil process water such as oil well production fluid from a suitable source or water produced upon treatment of oil well production fluid such as with a free water knock-out is moved through conduit 1 into a tank 2 which is equipped with a stirring device 3. A strong organic acid, preferably one that forms a water soluble salt with calcium ions and especially with other divalent and trivalent cations as well is also added to the tank through conduit 4 before, after or during the pumping of the oil production fee into tank 2. The hydrocarbon, e.g. a fuel, and the organic acid can be mixed prior to entering the tank, if desired. A mineral acid such as phosphoric acid, phosphorous acid, sulfuric acid, sulfurous acid or the like may be added in a premixed combination with the organic acid or at any of the points noted for addition of the organic acid as long as it is added simultaneously with or after the addition of the organic acid. The acids may be in the form of an aqueous solution or aqueous solutions. The amount of acid selected to be added is sufficient to lower the pH of the contents of the tank or flowing production line to between about 2 and about 6.

The organic acid, as noted, should be one that forms a water soluble salt with calcium ions. However, some chelate the Na, Ca, Mg, Ba, etc., and form a cloudy suspension which is removed by the processing equipment (e.g., flotation) rather than forming a scale deposit. Although $Ca^{+2}$ typically is the main contributor to scale, other divalent or trivalent cations such as barium and strontium may also be present and so it may be desirable that the organic acid be one that forms a water soluble salt with those ions as well. Any such organic acid is believed to be useful to some extent, but some such acids are preferred. For example, although Applicants do not wish to be bound to any particular theory, it is believed that the organic acid preferentially bonds to the cations in the system, thereby avoiding the formation of insoluble salts otherwise formed by some mineral acids and the cations. Thus, it is also preferable, especially when the mineral and organic acids are added simultaneously, that the organic acid have a lower pKa in aqueous solutions than does the mineral acid.

Accordingly, strong organic acids are preferred. For example, oxalic acid, hydroxyacetic acid, dichloroacetic acid, and so forth may be used. Hydroxyacetic acid, however, has been found to be particularly effective and further provides the surprising advantage that it results in a clear solution when employed in the present method, while use of other organic acids have been found to result in turbidity.

The use of a strong organic acid has been found to substantially reduce or eliminate scale formation that has been especially troublesome with phosphoric acid and so is particularly useful in combination with phosphoric acid, which also avoids or reduces the corrosion problems associated with other strong mineral acids such as hydrochloric or sulfuric acid. However, it has also been found that if an organic acid such as hydroxyacetic acid is used, significantly less overall acid by weight or volume is required to achieve the same or more effectiveness achieved with the mineral acid alone. In this role, hydroxyacetic acid has a pKa low enough to affect the pH by leaving it sufficiently acidic to allow the process to sequester Na, Ca, Mg, etc. from the water production. As a result, benefits are obtained by use of the organic acid with any mineral acid. Typically, however, mineral acids used in such technique include phosphoric acid, phosphorous acid, sulfonic acid and sulfurous acid.

The optimal relative proportion of mineral acid to organic acid depends on the system involved. However, it is desirable to employ sufficient organic acid to convert all the calcium ions to the water soluble salt. Thus, in most systems typically encountered, a mineral acid to organic acid molar ratio of from about 1:1 to about 3:1, especially from about 1.5:1 to about 2.7:1, is preferred although mixtures in a ratio of from about 1:0.5 to about 10:1 or even from about 99:1 to about 1:99 can yield advantageous results in certain situations. As noted, a sufficient amount of overall acid to reduce the pH of the tank contents or flowing production line to about 2 to about 6 is added. Generally, this amount of acid required is up to 33% less than that added in the methods of U.S. Pat. Nos. 4,818,410 and 4,839,054.

Minor amounts of other composition may also be added. For example, an acid inhibitor such as a chemfilm or chemsorb may be included to protect metal surfaces in the system from acid attack. Corrosion inhibitors, demulsifiers, alcohol and wetting agents, may also be included. Therefore, a typical acid formulation of premixed phosphoric acid and hydroxyacetic acid might be prepared, by weight, from about 36% water, 42% phosphoric acid (75% aqueous solution), 19% hydroxyacetic acid (70% aqueous solution), about 2% acid inhibitor and less than 1% each of a corrosion inhibitor, a wetting agent and isopropyl alcohol. Thus, the solution comprises by weight about 52% water, 31% phosphoric acid, 13% hydroxyacetic acid and the minor ingredients.

When the tank is suitably filled, the stirrer is rotated by means of a motor 5 or other driving means at a relatively low shear to provide intimate contact of the two phases without giving rise to significant emulsification of the oil phase and the liquid phase. Chemical oil-in-water demulsifiers and/or special flocculants, if needed, may be added separately or along with the feed or acid solution. If high shear conditions are avoided, a chemical demulsifier will not usually be needed.

Next the stirrer is stopped and the aqueous layer is allowed to separate gravitationally from the oil layer. The separated oil containing the petroleum carboxylate salts, etc. taken up from the aqueous phase is removed from tank 2 through a conduit 6.

The aqueous phase is transferred from tank 2 through a conduit 7 to an air flotation system (AFS) generally denoted by reference numeral 8 of conventional construction for further separation of the oil from the water, if needed. Other flotation systems, such as dissolved air flotation, can likewise be used to separate the oil from the water. Hence the invention is not limited to the use of any particular separation technique. A gas, such as air or more preferably oil field gas, i.e., methane, ethane, etc., is maintained in the cavity 9 of the container 10. A suitably bladed stirrer 11 powered by motor 12 is rotated to form a vortex 13 where the gas becomes mixed with liquid in container 10. As the gas is propelled into the liquid, the gas induces the minute particles of oil that may be entrained in the liquid to float to the top of container 10. A porous screen 14 surrounds the stirrer and aids the gas induced flotation of the oil particles. The oil is skimmed and removed from the system through conduit 15. A partial recycle of the water may be accomplished by diverting part of the water through recycle line 16, if needed. The water, whose petroleum acids content has been substantially reduced, is withdrawn from conduit 17. The water has a low level of water soluble organics, namely 50 ppm or less.

A standard air flotation system conventionally comprises a plurality of induced-gas flotation compartments, serially and/or parallel arranged, instead of one as illustrated herein. Each compartment may use a vertical direct rotating drive unit to disperse air or other gas into the aqueous stream by means of vortex generation and adjustable gates for skimming off the oil. An outlet cell (not shown) may be included to provide a quiescent zone for final separation of entrained gas and any particulates.

A conventional AFS system therefore involves means for entraining a suitable gas in the process water, means for mixing the liquid and gas, and recycle loops. Often, several stages of such equipment is provided in series in order to more completely separate free oil from the water. Under ordinary circumstances even at optimum operations, such equipment would discharge an effluent, from which essentially none of the water soluble organics had been removed. With the practice of the present invention, the effluent water would be almost free of both water soluble oil and water insoluble oil.

With reference now to FIG. 2 where a continuous system of water soluble organics removal and recovery is employed, oil production fluid or feed from a suitable source is brought into a tank 19 through a conduit 20; and an aqueous solution, or aqueous solutions, of a strong organic acid and a strong mineral acid, such as phosphoric acid, is brought into tank 19 through a conduit 21 to lower the pH to the desired range of 2–6. The feed enters the tank through conduit 20 and impinges on a baffle 23. This results in an intimate but low shear mixing of the two feeds under conditions such that emulsification does not become a substantial problem. The oil phase is moved through a conduit 24 into a tank 25. The aqueous phase is removed from tank 19 and pumped through a conduit 26 and discharged into the oil phase in tank 25 in the form of droplets or like minute particles. The droplets migrate through the oil phase and settle into the aqueous phase at the bottom of tank 25. As the droplets move through the oil phase, the water soluble organics are extracted from the aqueous phase and taken up by the oil phase.

The oil phase in tank 25 moves through a conduit 27 into a tank 28. The aqueous phase is removed from the bottom of tank 25 and pumped through a conduit 29 and discharged into the oil phase in tank 28 in the form of droplets or like minute particles. The droplets migrate through the oil phase and into the aqueous phase at the bottom of tank 28. Again, as the droplets move through the oil phase, the water soluble organics are extracted from the acid phase and are taken up by the oil phase. The oil phase leaves the system through a conduit 31 and the aqueous phase leaves the system through a conduit 32. If required, additional extraction tanks can be incorporated serially into the system to further reduce the amount of water soluble organics in the aqueous phase.

With reference now to FIG. 3, fuel oil having an inorganic salt content too high to meet the requirements for suitable burning in high-efficiency electric power generating units is fed continuously via a line 33 into a first electrostatic fuel wash unit 34. Water of acceptable quality is fed continuously to a second electrostatic fuel wash unit 35 via a line 36. The wash water from unit 35 is moved to unit 34 via a line 37. An aqueous solution of a strong mineral acid, such as phosphoric acid, is injected continuously into line 36 via a line 38 in amounts sufficient to lower the pH of the wash water to 6 or below. In units 34 and 35 a high voltage, low ampere gradient is maintained between the electrodes 40 during operation. Although not disclosed, the system can be provided with an injection device which controls the amount of acid injected into the wash water automatically in response to the determined flow rate and pH of the wash water.

The oil washed in unit 34 is fed via a line 41 to the top section of unit 35, wherein the water soluble organics in the wash water are transferred in whole or in part back to the fuel. The amount of oil in the extraction unit should be normally at least 5% of the total liquid in the unit. The washed fuel containing the water soluble organics is moved to a burner or for further processing via a line 42. The wash water from which the water soluble organics have been removed is moved via a line 43 to a point of further processing or of discharge from the system.

The following examples describe various embodiments of the invention. Other embodiments within the scope of the claims herein will be apparent to one of ordinary skill in the art from consideration of the specification or practice of the invention disclosed is intended that the specification and examples be considered exemplary only With the scope and spirit of the invention being indicated by the claims which follow the examples. Unless otherwise indicated all percentages herein are on a weight percent basis.

EXAMPLE 1

Three additives were tested for efficacy in WSO removal. Additive A was prepared by mixing 63 parts by weight of a 75% by weight aqueous solution of phosphoric acid with 34.25 parts by weight water, 2 parts by weight acid inhibitor that absorbs onto metal surfaces to protect the surface from acid corrosion, and 0.75 parts by weight wetting agent. Additive B represents an agent within the scope of the present invention and was prepared by mixing about 42 parts by weight of a 75% by weight aqueous solution of phosphoric acid with about 18 parts by weight of a 70% by weight aqueous solution of hydroxyacetic acid, about 36 parts by weight water, 2 parts by weight acid inhibitor that absorbs onto metal surfaces to protect the surface from acid corrosion, 0.63 parts by weight wetting agent, 0.5 parts by weight corrosion inhibitor, and 0.4 parts by weight isopropyl alcohol. Additive C was prepared by mixing about 39 parts by weight of a 22% by weight aqueous solution of hydrochloric acid with about 57 parts by weight water and about 4 parts by weight hydrochloric acid inhibitor.

The efficacy of various concentrations of each additive was measured on water derived from an oil well. The tests were conducted as follows. Water from a well was added to a 3-gallon carboy fitted with a valve near the bottom. The water was agitated briefly and samples of the water were drawn from the carboy into Wirtle funnels. For each test, an aliquot (150 ml) of the water sample from a Wirtle funnel was added to a 250 ml separatory funnel. Produced oil (15 ml 10%) was added to the separatory funnel and additive to be evaluated was added to the separatory funnel, which was then gently agitated for 100 shakes and allowed to settle for 10 minutes. The water phase was drawn off from the separatory funnel into a jar and then charged back from the jar into a cleaned separatory funnel, washed with freon and measured for WSO content. The pH and WSO level of the water were measured after separation and compared to the situation in which no additive was employed. The results are set forth in the following Table I, in which the additive concentration and the WSO level are each given in parts per million, based on weight. As shown in the Table I, Additive C was tested on two samples of water.

TABLE I

| Additive Concentration | Additive A | | Additive B | | Additive C | | | |
|---|---|---|---|---|---|---|---|---|
| | pH | WSO | pH | WSO | pH | WSO | pH | WSO |
| 0 | 5.76 | 330 | 5.9 | 340 | 6.0 | 180 | 5.9 | 340 |
| 250 | 4.87 | 170 | | | 5.9 | 180 | | |
| 500 | 4.41 | 72.5 | 4.2 | 53.5 | 5.7 | 220 | 5.4 | 230 |
| 750 | 3.06 | 45 | | | 5.5 | 110 | | |
| 1000 | 2.55 | 47 | 3.9 | 44.5 | 5.2 | 110 | 4.7 | 110 |
| 1250 | | | | | 5.2 | 70 | | |
| 1500 | | | | | 5.0 | 54 | 3.7 | 44 |
| 2000 | | | | | 2.3 | 24 | | |
| 3000 | | | | | 1.3 | 36.5 | | |

EXAMPLE 2

The additives of Example 1 were tested on further water samples from wells in accordance with the method of Example 1. The results are shown in Table II:

TABLE II

| Additive Concentration | Additive A | | Additive B | | Additive C | | | |
|---|---|---|---|---|---|---|---|---|
| | pH | WSO | pH | WSO | pH | WSO | pH | WSO |
| 0 | 6.1 | 135 | 6.1 | 120 | 6.5 | 105 | 6.4 | 147 |
| 250 | | | | | | | 6.1 | 111 |
| 500 | 5.1 | 62 | 5.1 | 46.5 | 5.6 | 75 | 6.2 | 92 |
| 750 | | | 4.3 | 5 | | | 5.9 | 46 |
| 1000 | 4.3 | 90 | 2.9 | 5 | 5.3 | 82 | 5.6 | 36 |
| 1250 | | | 2.6 | 2.3 | 4.8 | 53 | 5.8 | 39 |
| 1500 | 2.5 | 14 | 2.5 | 4 | 3.7 | 37 | 5.7 | 41 |
| 1750 | | | | | | | 5.5 | 41 |
| 2000 | 1.9 | 6 | | | 2.7 | 3 | 5.2 | 19 |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method of removing water soluble organics from oil process water containing cations that tend to form scale upon exposure to phosphoric acid, comprising the steps of
   a) adjusting the pH of the water to within the range of about 2–6 by incorporating in the water an organic acid and a mineral acid selected from the group consisting of phosphoric acid, phosphorous acid, sulfuric acid and sulfurous acid in an organic acid to mineral acid molar ratio of from about 99:1 to about 1:99, the organic acid being added in an amount sufficient to form water soluble salts with said cations thereby to inhibit scale formation in the water after addition thereto of the mineral acid, the organic acid being incorporated into the water simultaneously with or prior to the incorporation of the mineral acid into the water thereby to form acidified water;
   b) thereafter or simultaneously contacting the acidified water intimately with oil with the result that the content of water soluble organics in the water is substantially reduced by migration from the water to the oil; and
   c) separating the oil and the water.

2. The method of claim 1 wherein the mineral acid is phosphoric acid or phosphorous acid.

3. The method of claim 1 wherein the pH is within the range of 3–6.

4. The method of claim 1 wherein the organic acid is one that forms water soluble salts with divalent and trivalent cations, other than calcium ions, in the water.

5. The method of claim 1 wherein the organic acid is hydroxyacetic acid.

6. The method of claim 1 wherein the water soluble organics include petroleum carboxylate anions.

7. The method of claim 1 wherein the water is water removed from an oil well along with crude oil.

8. The method of claim 1 wherein the water is water used to extract corrosive inorganic compounds from fuel oil to render the fuel oil suitable for fueling gas turbine power plants.

9. The method of claim 1 wherein mineral acid is incorporated in the water after the incorporation of the organic acid, but before separating the oil and the water.

10. The method of claim 9 wherein the mineral acid has a pKa higher than the organic acid and is incorporated in the water simultaneously with the incorporation of the organic acid.

11. The method of claim 10 wherein the organic acid is hydroxyacetic acid.

12. The method of claim 9 wherein the organic acid is hydroxyacetic acid.

13. The method of claim 1 wherein the contacting step is carried out by agitating the acidified water intimately with oil.

14. The method of claim 1 wherein the oil process water is oil well production fluid.

15. The method of claim 1 wherein the oil process water contains calcium ions.

16. The method of claim 1 wherein the organic acid to mineral acid molar ratio is from about 1:3 to about 1:1.

17. The method of claim 1 wherein the cations are calcium ions.

18. The method of claim 1 wherein the cations bond preferentially with the organic acid versus the mineral acid, thereby to inhibit scale formation.

19. The method of removing water soluble petroleum carboxylates in anionic form from water accompanying the removal of crude oil withdrawn from an oil well and containing cations that tend to form scale upon exposure to phosphoric acid, said method comprising the steps of:
   a) separating the crude oil from the water;
   b) adding a strong organic acid to the water and thereafter or simultaneously therewith adding a mineral acid selected from the group consisting of phosphoric acid, phosphorous acid, sulfuric acid and sulfurous acid to the water in a mineral acid to organic acid molar ratio of from about 99:1 to about 1:99, the organic acid and mineral acid being added in an amount sufficient to reduce the pH of the water to within the range of 2–6, the organic acid being added in an amount sufficient to form water soluble salts with said cations thereby to inhibit scale formation in the water after addition thereto of the mineral acid;
   c) intimately contacting the thus acidified water with a treating oil with the result that the content of the water soluble organics in the water is substantially reduced by migration from the water to the treating oil; and d) thereafter separating the treating oil from the acidified water.

20. The method of claim 19 wherein the mineral acid is phosphoric acid or phosphorous acid.

21. The method of claim 19 wherein the oil used in contact with the acidified water is the same crude oil that is removed from the oil well.

22. The method of claim 21 wherein a chemical demulsifier is used in separating the oil from the water.

23. The method of claim 19 wherein the steps are carried out in a continuous fashion.

24. The method of claim 19 wherein the contacting step is carried out by agitating the acidified water intimately with oil.

25. The method of claim 19 wherein the oil process water is oil well production fluid.

26. The method of claim 19 wherein the organic acid to mineral acid molar ratio is from about 1:3 to about 1:1.

27. The method of removing water soluble petroleum carboxylates in anionic form from water containing cations that tend to form scale upon exposure to mineral acid, accompanying the removal of crude oil withdrawn from an oil well comprising the steps of:

a) separating the crude oil from the water;

b) adding hydroxyacetic acid to the water and thereafter or simultaneously therewith adding a mineral acid selected from the group consisting of phosphoric acid, phosphorous acid, sulfuric acid and sulfurous acid to the water in a mineral acid to hydroxyacetic acid molar ratio of from about 3:1 to about 1:1, the hydroxyacetic acid and mineral acid being added in an amount sufficient to reduce the pH of the water to within the range of 2–6, the hydroxyacetic acid being added in an amount sufficient to form water soluble salts with said cations thereby to inhibit scale formation in the water after addition thereto of the mineral acid;

c) intimately contacting the thus acidified water with a treating oil with the result that the content of the water soluble organics in the water is substantially reduced by migration from the water to the treating oil; and d) thereafter separating the treating oil from the acidified water.

* * * * *